US005567941A

United States Patent [19]
Fujikawa et al.

[11] Patent Number: 5,567,941
[45] Date of Patent: Oct. 22, 1996

[54] PYROELECTRIC TYPE INFRARED SENSOR

[75] Inventors: Kazuhiko Fujikawa, Takatsuki; Koji Nomura, Shijyonawata; Teruhiro Shiono, Osaka; Hisahito Ogawa, Ikoma-gun, all of Japan

[73] Assignee: Matsushita Electric Industrial Co., Ltd., Osaka, Japan

[21] Appl. No.: 310,399

[22] Filed: Sep. 22, 1994

[30] Foreign Application Priority Data

Sep. 22, 1993 [JP] Japan .................. 5-236202
Sep. 22, 1993 [JP] Japan .................. 5-236203

[51] Int. Cl.⁶ ............................................. G01J 5/08
[52] U.S. Cl. ............................... 250/353; 250/338.3
[58] Field of Search ........................... 250/338.3, 353

[56] References Cited

U.S. PATENT DOCUMENTS

| | | |
|---|---|---|
| 4,445,759 | 5/1984 | Valette . |
| 4,682,030 | 7/1987 | Rose et al. ............ 250/338.3 |
| 4,717,821 | 1/1988 | Messiou .............. 250/DIG. 1 |
| 4,800,278 | 1/1989 | Taniguti et al. ........ 250/338.3 |
| 4,854,730 | 8/1989 | Fraden ................. 374/164 |
| 5,073,007 | 12/1991 | Kedmi et al. ............ 359/565 |
| 5,315,434 | 5/1994 | Mizuno et al. ........ 250/338.3 |
| 5,401,968 | 3/1995 | Cox ..................... 250/353 |

FOREIGN PATENT DOCUMENTS

| | | |
|---|---|---|
| 62-197725 | 9/1987 | Japan . |
| 5133803 | 5/1993 | Japan .................. 250/353 |
| 2165639 | 4/1986 | United Kingdom . |
| 87/00297 | 1/1987 | WIPO . |

OTHER PUBLICATIONS

T. Werner et al., SPIE, vol. 1544, pp. 46–57 (1991).
Patent Abstracts of Japan, Unexamined Applications, P Field, vol. 12, No. 51, Feb. 16, 1988.

Primary Examiner—Carolyn E. Fields
Attorney, Agent, or Firm—McDermott, Will & Emery

[57] ABSTRACT

An object of the invention is to provide a pyroelectric type infrared sensor without external lens, made in a compact size, and having an improved sensibility. A pyroelectric element for detecting infrared rays is provided in a sealed tube (sealed body) having an opening, at said opening is provided an incident infrared ray filter. A diffraction optical lens (diffraction optical element) for focusing or imaging infrared rays is provided on the front or back surface of said incident infrared ray filter.

25 Claims, 15 Drawing Sheets

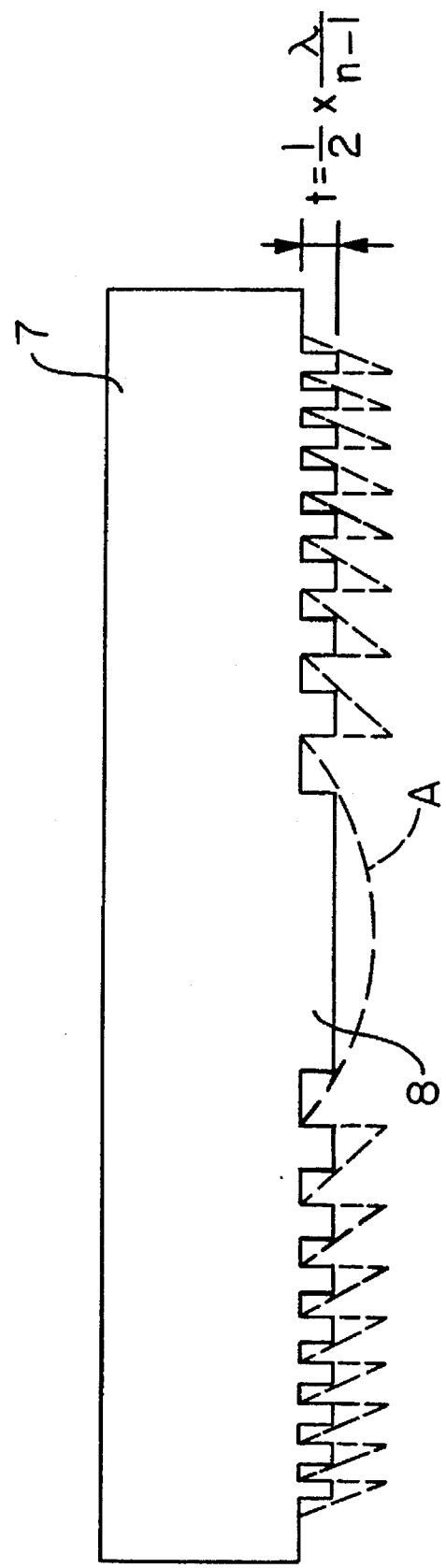

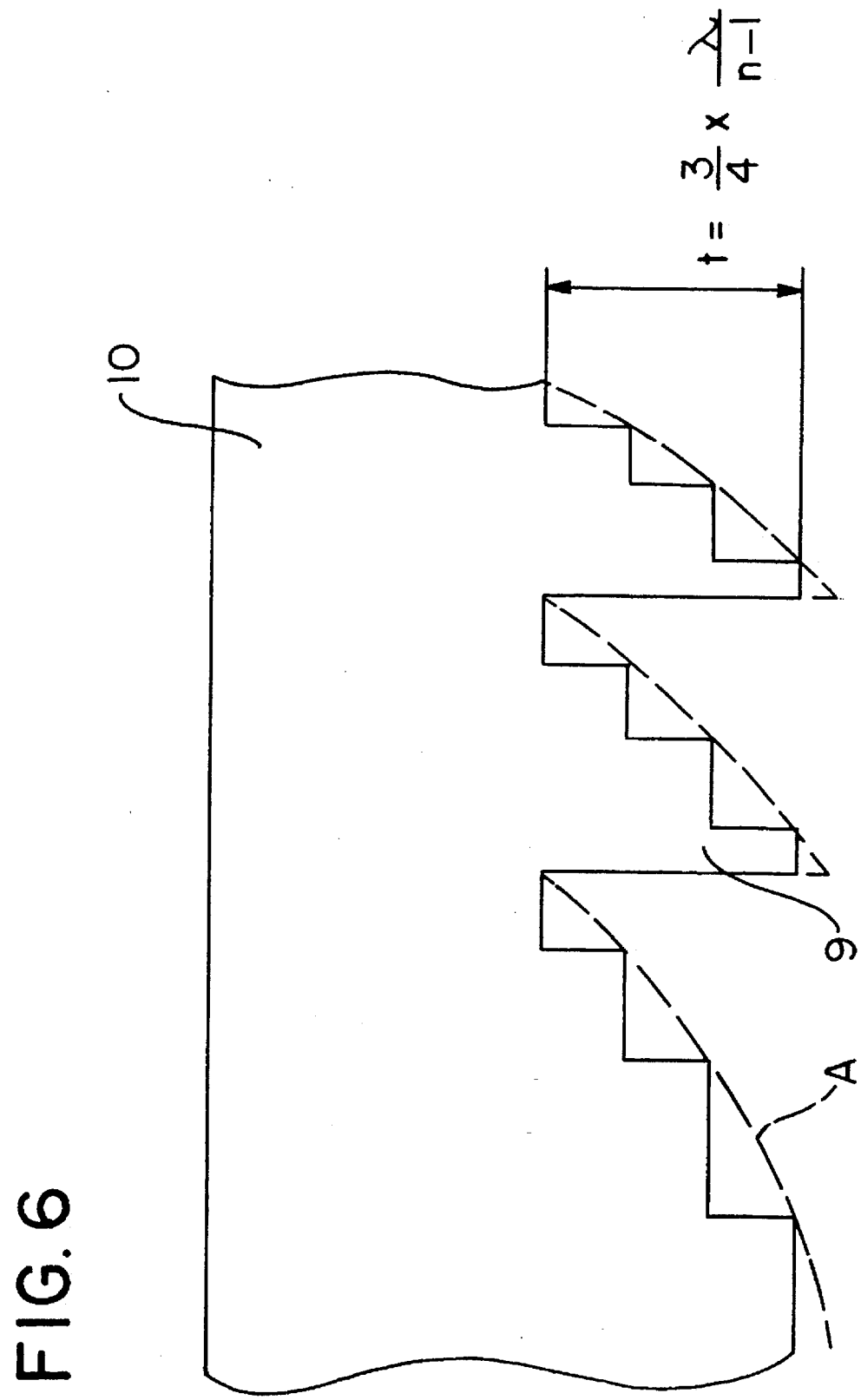

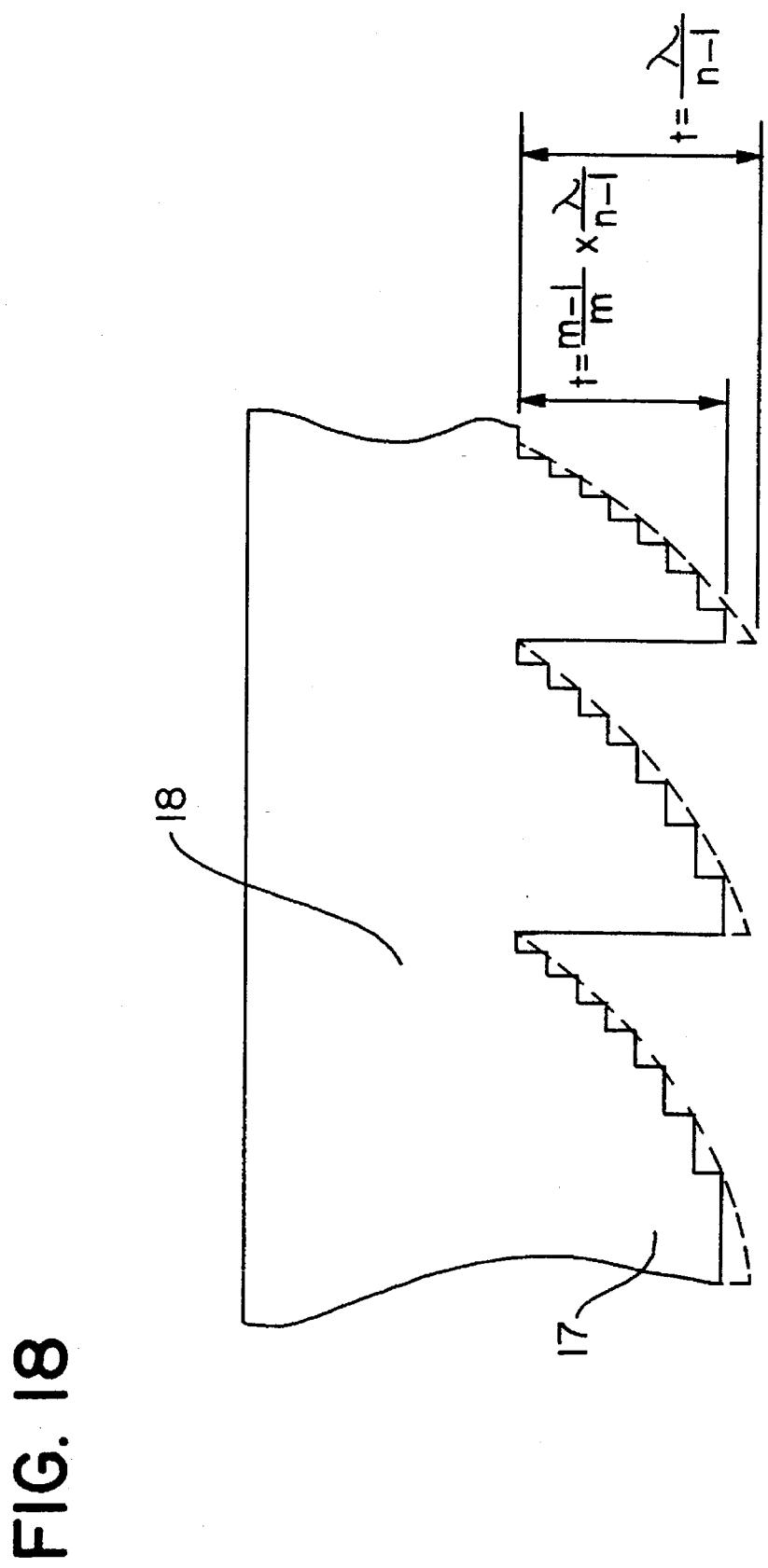

PYROELECTRIC TYPE INFRARED SENSOR

FIELD OF THE INVENTION

The present invention relates to a pyroelectric type infrared sensor for detecting infrared rays over a wide range using a pyroelectric element.

BACKGROUND OF THE INVENTION

Recently, pyroelectric type infrared sensors have been used for measuring temperatures of foods cooking in microwave ovens, controlling room temperature using air conditioners, detecting motion in automatic doors or alarm devices, and the like because the pyroelectric type infrared sensors can detect temperature or other elements without contact. The field of application for these devices is continually expanding.

A pyroelectric type infrared sensor uses the pyroelectric effect of a lithium tantalate ($LiTaO_3$) single crystal and the like. A pyroelectric substance has a self polarization characteristic, so surface charges are always generated, but the surface charges combine with the charges in the atmosphere to maintain a electrically neutral state when in a stationary condition. Once infrared rays incident the pyroelectric substance, the temperature of the pyroelectric substance is changed, accordingly the neutral charge state on the surface is destroyed and changed. When this occurs, the charge generated on the surface is detected to measure the amount of the incident infrared rays. Thus, a pyroelectric type infrared sensor is created. Generally, pyroelectric substances emit infrared rays according to their temperatures. Thus, the existence or the temperature of objects can be detected by using the pyroelectric type infrared sensor.

A conventional pyroelectric type infrared sensor is structured as shown in FIG. 20. A pyroelectric element 21 is formed of ceramics and detects infrared rays. A sealed tube 22 covers the pyroelectric element 21 to protect it from disturbance light and electromagnetic noise. An incident infrared ray filter 24 is installed at the opening 23 of the sealed tube 22. An external lens 25 is placed outside of the sealed tube 22 and focuses or images the infrared rays 26 emitted from the object onto the pyroelectric element 21. An external lens 25 is a refraction type fresnel lens formed of polyethylene resin utilizing the refraction action of light. The depth T of each of the recesses or slots of the fresnel lens is increased as the position of the recesses or slot moves outwardly so that the declining angle of the slot becomes larger, the light is refracted at the oblique surface of the recsses or slot and focused. The recesses or slots are arranged in equal distances, and the distances between the slots and the depths of the slots are from hundreds to thousands times larger than the wavelength. The dimension of the slots is also large in comparison to the wavelength.

In this conventional pyroelectric type infrared sensor, the external lens 25 is a refraction type lens disposed outside of the sealed tube 22 and focuses or images the infrared rays 26 emitted from the object onto the pyroelectric element. The size of the external lens 25 is large due to the structure of the conventional pyroelectric infrared sensor as described above. Further the size of pyroelectric sensor is also large due to the positional relationship between the external lens 25 and the sealed tube 22. Thus, it is difficult to create a compact pyroelectric sensor.

Another problem with the conventional pyroelectric sensor is that the infrared rays 26, focused and imaged onto the pyroelectric element 21, have to pass the external lens 25. Accordingly the quantity of the light incident on the pyroelectric element 21 becomes very small due to the influence of the reflection and absorption of the light when light passes the external lens. This effect results in lowering of the detection sensitivity.

The conventional pyroelectric type infrared sensor does not provide the important advantage of compact size and improved detection of infrared rays.

SUMMARY OF THE INVENTION

An object of the invention is to achieve a compact pyroelectric type infrared sensor without using external lens and to improve sensitivity for detecting infrared rays.

To achieve this object, the present invention comprises a pyroelectric element for detecting infrared rays in a sealed tube (sealed body) with an opening, the opening being provided with an incident infrared ray filter. A diffraction optical lens (diffraction optical element) for focusing and imaging infrared rays onto said pyroelectric element is provided on the front or back surface of said incident infrared ray filter. Also, a diffraction optical element array is provided on the front or back surface of said incident infrared ray filter. The diffraction optical element array has at least two diffraction optical elements, and these diffraction optical elements are adapted to focus or image.

According to the invention, the diffraction optical elements are integrally formed on the front or back surface of said incident infrared ray filter to focus and image the incident infrared rays onto the pyroelectric element by diffracting the infrared rays. Thus, the dimension of the diffraction optical element cannot be larger than that of the incident infrared ray filter, and there is no need to provide an external lens outside of the sealed tube. Accordingly, the pyroelectric infrared sensor can be a compact size.

Also, because there is no external lens, the influence due to the reflection and absorption by the external lens is eliminated, sufficient infrared rays thus are incident on the pyroelectric element, thus resulting in improvement of the detecting sensitivity.

Also, when optical adjustment is performed beforehand so that the infrared rays passing the diffraction optical element array provided on the incident infrared rays passing the diffraction optical element array provided on the incident infrared ray filter are focused and imaged onto the pyroelectric element, as the diffraction optical element is fixed in the directions of the optical axis and of the rotation of two axes (x, y axes) on a plane perpendicular to the optical axis in the step of installing the incident infrared ray filter onto the outside of the sealed tube, the optical adjustment is completed by only positioning of rotating directions of x, y and the light axis. Accordingly, the optical adjustment of the diffraction optical element can be performed easily.

Additionally, by adopting a diffraction optical element array, a wider detecting range than in a single diffraction optical element can be obtained.

The invention itself, together with further objects and attendant advantages, will best be understood by reference to the following detailed description taken in conjunction with the accompanying drawings.

BRIEF DESCRIPTION OF THE DRAWINGS

FIG. 5 is an enlarged sectional view of a diffraction optical element of the pyroelectric type infrared sensor.

FIG. 6 is an enlarged sectional view of a diffraction optical element of the pyroelectric type infrared sensor of a third embodiment of the present invention.

FIG. 18 is an enlarged sectional view of a diffraction optical element of the pyroelectric type infrared sensor of an eighth embodiment of the invention.

DESCRIPTION OF THE PREFERRED EMBODIMENTS

Figure 1:
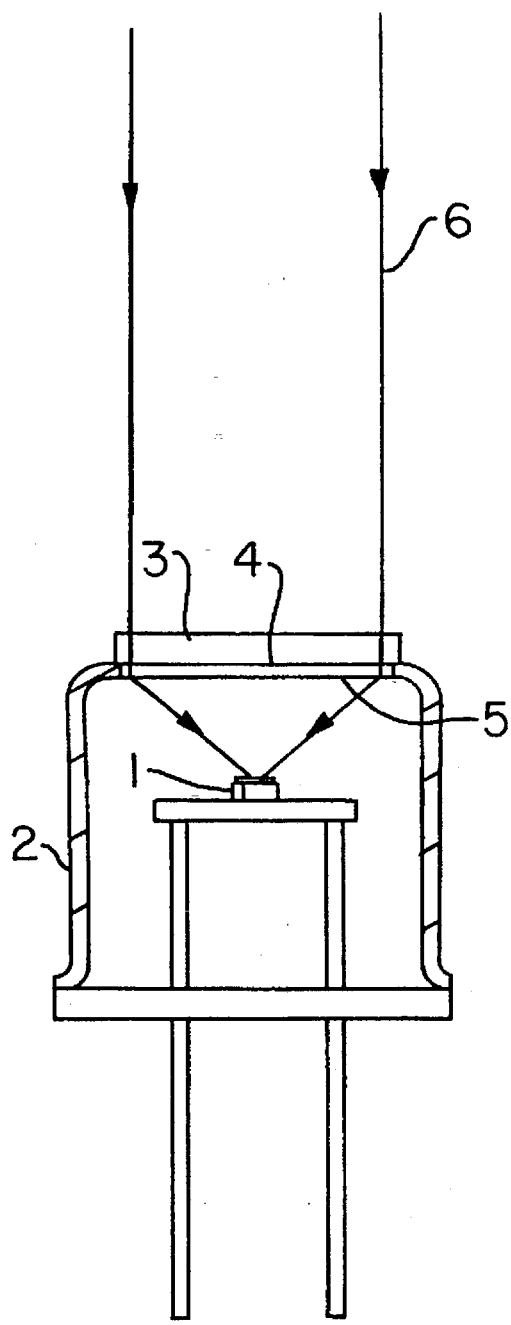
FIG. 1 is a sectional view of a pyroelectric type infrared sensor of a first embodiment of the invention.
Figure 2:
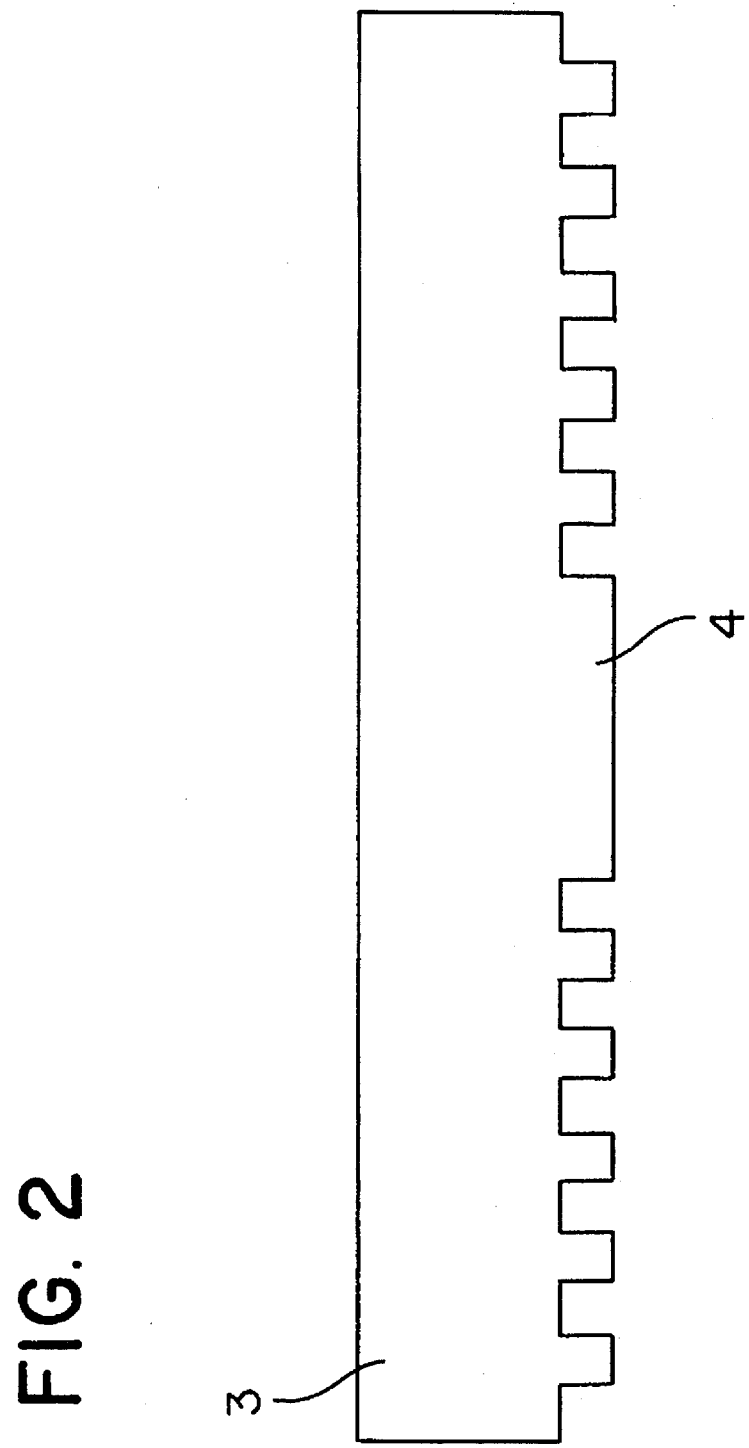
FIG. 2 is an enlarged sectional view of a diffraction optical element of the pyroelectric type infrared sensor.
Figure 3:
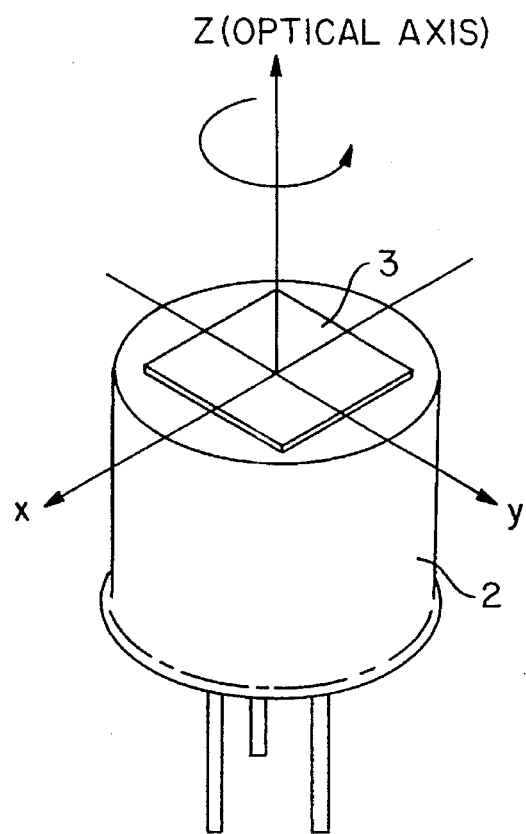
FIG. 3 is a perspective view showing the operation in the optical adjustment of the diffraction optical element of the pyroelectric type infrared sensor.

Turning now to the drawings, a first embodiment of the present invention will be illustrated referring to FIG. 1–FIG. 3. FIG. 1 is a sectional view of a pyroelectric type infrared sensor of a first embodiment of the present invention. FIG. 2 is an enlarged sectional view of a diffraction optical element of the pyroelectric type infrared sensor. FIG. 3 shows the operation in the optical adjustment of the diffraction optical element.

As shown in FIG. 1, the pyroelectric element 1 is formed of lithium tantalate ($LiTaO_3$), used for detecting infrared rays 6, and disposed in the sealed tube (sealed body) 2. The sealed tube 2 is used for protecting the pyroelectric element 1 from disturbance light and electromagnetic noise. The outside diameter of the sealed tube is 5 mm and an opening 5 of 2.5 mm diameter is provided on the upper portion of the tube. An incident infrared filter 3 is formed of a silicon substrate 0.4 mm thick and 3 mm square, and provided to cover the opening 5 at the outside of the opening 5. A diffraction optical lens (diffraction optical element) 4 is formed on the back side surface, which is facing the pyroelectric element 1, of the incident infrared ray filter 3, and refracts the infrared rays to focus or image. The diffraction optical lens 4 is formed in an ultra thin shape, and as shown in FIG. 2, has rectangular shaped recesses or slots and the depths of the slots are identical over the whole surface of the diffraction optical lens 4.

The operation of the device of FIG. 1 described above will be illustrated. The infrared rays 6 emitted from the object to be detected reach the incident infrared ray filter 3 without receiving influence of the reflection and absorption. The original quantity of light of the infrared rays 6 is maintained and passes through the diffraction optical lens 4 formed on the back side surface of the incident infrared filter 3. The infrared rays 6 are then focused or imaged on the pyroelectric element 1 disposed in the sealed tube 2. As a result, temperature of the pyroelectric element 1 is changed, and the charge state on the surface of pyroelectric element 1 changes from its neutral state. The charge generated on the surface of pyroelectric element 1 is detected to measure the amount of the incident infrared rays. As the diffraction optical lens 4 for focusing or imaging the infrared rays is integrally formed with incident infrared ray filter 3, the size of the diffraction optical lens 4 cannot be larger than the incident infrared filter 3, and there is no need to install a lens for focusing or imaging the infrared rays 6 onto the pyroelectric element 1 at the outside of the sealed tube 2. Thus, the pyroelectric type infrared sensor can be made compact. Further, because there is no interference from the reflection and absorption of the infrared rays 6, the infrared rays can be sufficiently focused or imaged onto the pyroelectric element 1 resulting in improvement of the sensitivity of the pyroelectric type infrared sensor.

In this embodiment, the diffraction optical lens 4 is provided on the back surface of the incident infrared ray filter 3, but the same effect can be obtained by providing the diffraction optical lens 4 on the front surface of the incident infrared ray filter 3.

Also, as shown in FIG. 3, when the diffraction optical lens 4 is optically adjusted, as the diffraction optical lens 4 is fixed in the directions of the optical axis and of rotation of two axes (x, y axes) on a plane perpendicular to the optical axis in the step of installing the incident infrared ray filter 3 onto the sealed tube 2, the optical adjustment is completed by only positioning of rotating directions of x, y, and the light axis, so the optical adjustment can be performed easily.

Figure 4:
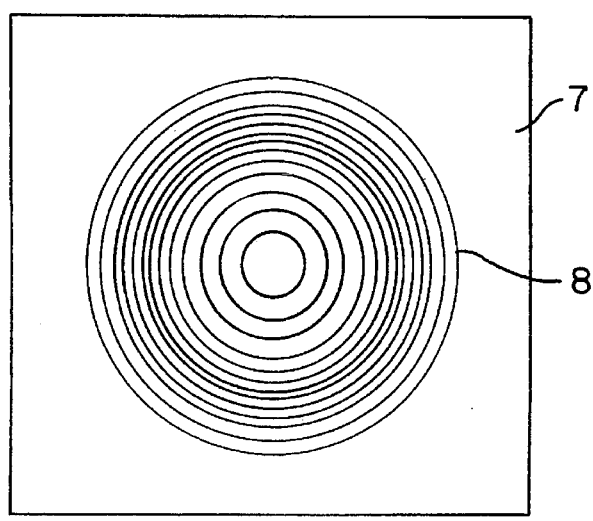
FIG. 4 is a plane view of a diffraction optical element of a pyroelectric type infrared sensor of a second embodiment of the invention.

Next, a second embodiment of the present invention will be illustrated referring to FIG. 4 and FIG. 5. A pyroelectric type infrared sensor of this embodiment is formed by improving the diffraction optical lens 4 of the first embodiment. FIG. 4 is a plane view of the diffraction optical lens formed by improving the diffraction optical lens of the first embodiment. FIG. 5 is an enlarged sectional view of the diffraction optical lens 8 formed on the back surface of the incident infrared ray filter 7 having recesses or slots corresponding to phase modulation amount. The depths of all recesses or slots of the diffraction optical lens 8 are the identical, the shapes of the recesses or slots are coaxial circles, and the periods of the slots are getting smaller towards the circumference to depend on the wavelength of incident infrared rays, and to increase the focusing efficiency of infrared rays by diffraction phenomena. Other parts of this embodiment are the same as in the first embodiment.

The operation of this embodiment will be illustrated in conjunction with FIG. 5. The diffraction optical lens 8 has recesses or slots corresponding to phase modulation amounts, and the pitches and depths of recesses or slots are adapted to depend on the wavelength of incident infrared rays 6. The side faces of rugged figure A corresponding to the phase modulation amounts agree with the edges of the recesses or slots. When the depth of the recesses or slots is denoted as t, the wave length of the infrared rays 6 as λ, refractive index of the diffraction optical lens 8 as n, $$t=\lambda/2(n-1)$$

and at this moment, the diffraction efficiency of the infrared rays 6 at the diffraction optical lens 8 becomes a maximum. Accordingly, the diffraction efficiency of infrared rays 6 incident on the diffraction optical lens 8 is improved. As a result, the light quantity of infrared rays 6 focused or formed to image on the pyroelectric element 1 is increased.

As described above, this embodiment has another effect in addition to the effect of the first embodiment. The diffraction optical lens 8 has recesses or slots corresponding to phase modulation amounts, the pitches and depths of the recesses or slots depend on the wavelength of incident infrared rays 6, periods of the recesses or slot patterns of coaxial circle shapes get smaller towards the circumference, and the side faces of the rugged figure A corresponding to the phase modulation amounts agree with the edges of the recesses or slots. As a result, the focusing efficiency of infrared rays 6 by diffraction phenomena can be increased, the diffraction efficiency of the diffraction optical lens 8 also increases, the light quantity of the infrared rays 6 focused or imaged on the pyroelectric element 1 is increased, and the sensitivity is increased.

Next, a third embodiment of the invention will be illustrated referring to FIG. 6. A pyroelectric type infrared sensor of this embodiment is formed by improving the diffraction optical lens 4 of the second embodiment. FIG. 6 is an enlarged sectional view of the diffraction optical lens improved from the diffraction optical lens of the second embodiment.

As shown in FIG. 6, the diffraction optical lens 9 formed on the incident infrared ray filter 10 has recesses or slots corresponding to phase modulation amounts. These recesses or slots are formed in stair-like shapes with four steps. Other parts of this embodiment are the same as in the first embodiment.

The operation of this embodiment will be described below. The diffraction optical lens 9 is formed in a shape having stairs with four steps so that the four edges of the steps agree with a surface of the rugged figure A corresponding to the phase modulation amounts. The pitches and the depth of the recesses or slots depend on the wave length of the incident infrared rays 6. When the depth of the recesses or slots is denoted as t, the wave length of the infrared rays 6 is denoted as λ, and the refractive index of the diffraction optical lens 9 is denoted as n, $$t=3\lambda/4(n-1).$$

The diffraction efficiency of infrared rays 6 at the diffraction optical lens 9 is, if the reflection is neglected, about 81%. Therefore, the diffraction efficiency of infrared rays 6 on the diffraction optical lens 9 is improved. As a result, the light quantity of the infrared rays focused or imaged on the pyroelectric element 1 can be increased.

Further, a diffraction optical lens is formed in a shape having stairs with m steps (m=2", n is positive integer of larger than 0) so that the edges of the steps agree with a surface of the rugged figure A corresponding to the phase modulation amounts. The pitches and the depth of the recesses or slots depend on the wavelength of the incident infrared rays 6. When the depth of the recesses or slots is denoted as t, the wavelength of the infrared rays 6 is denoted as λ, and the refractive index of the diffraction optical lens 9 is denoted as n, $$t=(m-1)/m\times\lambda/4(n-1).$$

If m is made larger, the diffraction efficiency of the infrared rays 6 incidenting to the diffraction optical lens 9 is improved. That is, the diffraction efficiencies of infrared rays 6, if the reflection is neglected, are about 41% when the number of the steps m=2; 81% at m=4; 95% at m=8; and 99% at m=16.

As described above, this embodiment has another effect in addition to the effect of the second embodiment. The diffraction optical lens 9 is formed in a stair-like shape so that the edges of the stairs agree with a surface of the rugged figure A corresponding to the phase modulation amounts. The pitches and depths of the recesses or slots depend on the wavelength of incident infrared rays 6. As a result, diffraction efficiency of the diffraction optical lens 9 is improved, so the light quantity of the infrared rays 6 focused or imaged on the pyroelectric element 1 is increased, and the sensitivity of the pyroelectric type infrared sensor can be further increased. The diffraction efficiency at 16 steps of recesses or slot is, if the reflection is neglected, about 99%.

Next, a fourth embodiment of the invention will be illustrated. The incident infrared ray filter 3 and the diffraction optical lens (diffraction optical element) 4 are made of the identical substance including at least one selected from silicon and germanium or at least one selected from gallium and indium or at least one selected from indium and germanium and at least one selected from arsenic and phosphorus. The diffraction optical lens 4 can be formed inside of the incident infrared filter 3 resulting in a more compact pyroelectric type infrared sensor. Further, the refractive index of the diffraction optical lens can be made larger, so the depth of the recesses or slots on the diffraction optical lens 4 can be made shallower, thus resulting in shorter manufacturing time.

Here, if the incident infrared ray filter 3 and the diffraction optical lens 4 are made of a substance including at least one selected from the group of silicon, germanium, gallium arsenide, indium phosphate, and gallium phosphate, the effect is further improved.

By forming a non-reflective interference film on the front or back surface of the diffraction optical lens 4, 8, or 9 in each of the embodiments, as the reflection at the diffraction optical lens 4, 8, or 9 becomes small, the sensitivity of the pyroelectric type infrared sensor can be further improved.

Also, by providing an interference film filter which passes only a specific wavelength range on the opposite side surface of the infrared ray filter 3, 7, or 10 to the surface on which the diffraction optical lens 4, 8, or 9 is formed, the disturbance light such as the sun light and incandescent light is cut, and the sensitivity of the pyroelectric type infrared sensor can be further improved.

Further, diffraction optical lens 4, 8, or 9 are used as diffraction optical elements though, the same effect can be obtained by using a variable refractive index type diffraction optical lens.

Figure 7A:
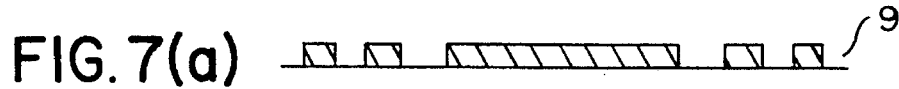
FIG. 7 is a process view of the diffraction optical element of the pyroelectric type infrared sensor.
Figure 7B:
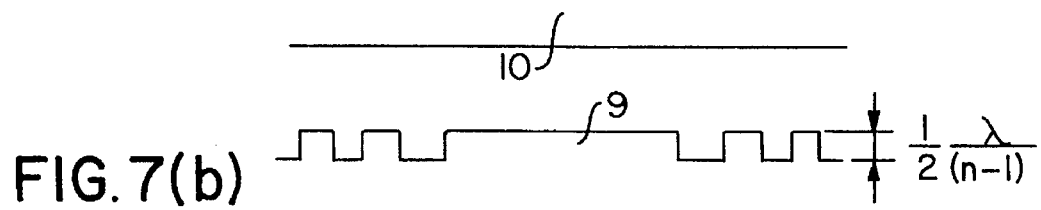
Figure 7C:
Figure 7D:

Next, the steps for forming stair-like shaped recesses or slots on the diffraction optical lens 9 in the third embodiment will be illustrated. As shown in FIG. 7, the stair-like shaped recesses or slots are formed by etching. The manufactured steps in the case of the stairs having four steps comprises: a first step of forming a resist pattern by photolithography as shown in FIG. 7(a); a second step of making slots by dry etching to the depth ½ ×λ/(n−1) as shown in FIG. 7(b), where, n denotes the refractive index of the diffraction optical lens 9 and λ denotes wavelength of the incident infrared rays; a third step of forming a resist pattern by photolithography as shown in FIG. 7(c); and a fourth step of making slots by dry etching to the depth ¼×λ/ (n−1) as shown in FIG. 7(d).

As the recesses or slots of stair-like shape on the diffraction optical lens 9 are formed by etching, the recesses or slots can be formed in a rectangular shape having sharp and accurate edges. This results in readiness of manufacturing the diffraction optical lens 9. As the diffraction optical lens 9 is formed in a stair-like shape corresponding to phase modulation amount, so the diffraction optical lens 9 is easily formed.

The four step recesses or slots are illustrated above, however, it is not limited to four step recesses or slots. Eight and over step recesses or slots can also be formed by dry etching from the state shown in FIG. 7(d). Also, the diffraction optical lens 9 in the third embodiment was illustrated above though, the diffraction optical lens 4 or 8 in the first and second embodiment can be formed in the same manner.

Figure 8:
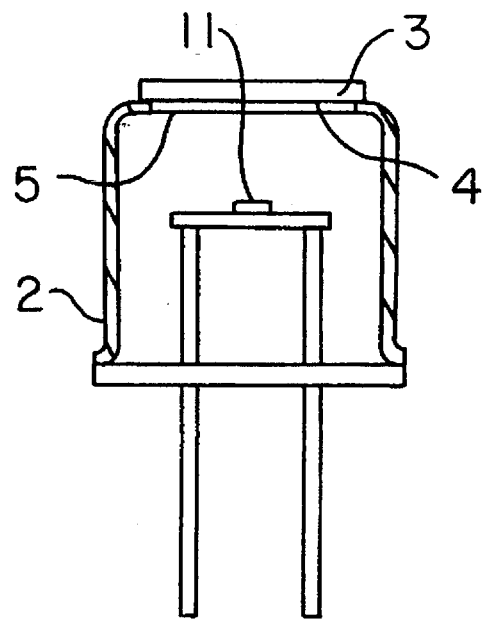
FIG. 8 is a sectional view of a pyroelectric type infrared sensor of a fifth embodiment of the invention.
Figure 9:
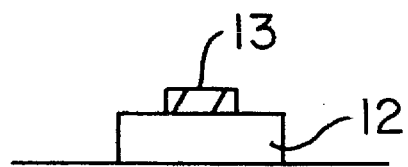
FIG. 9 is an enlarged sectional view of a pyroelectric element of the pyroelectric type infrared sensor.

A fifth embodiment of the invention will be illustrated referring to FIG. 8 and FIG. 9. Like elements as in the first embodiment are the same and the illustration of those elements is omitted.

FIG. 8 is a sectional view of a pyroelectric type infrared sensor of the fifth embodiment of the present invention, FIG. 9 is a front view of the pyroelectric element.

As shown in the figures, the pyroelectric element 11 is made by providing a thin film 13 of lead titanate (hereinafter denoted as PLT) including lanthanum on a magnesium oxide substrate 12. The thin film 13 has a dimension of 300×300 μm square for example. The PLT thin film 13 of one tenth area of ceramic type has the equivalent sensitivity as the ceramic type, and the PLT thin film 13 further has ten times higher response speed. Accordingly, the size of a sealed tube for accommodating a pyroelectric element 11 can be decreased. Since the PLT thin film 13 is used as a pyroelectric element 11 in the embodiment, the pyroelectric type infrared sensor can be made smaller.

Figure 10:
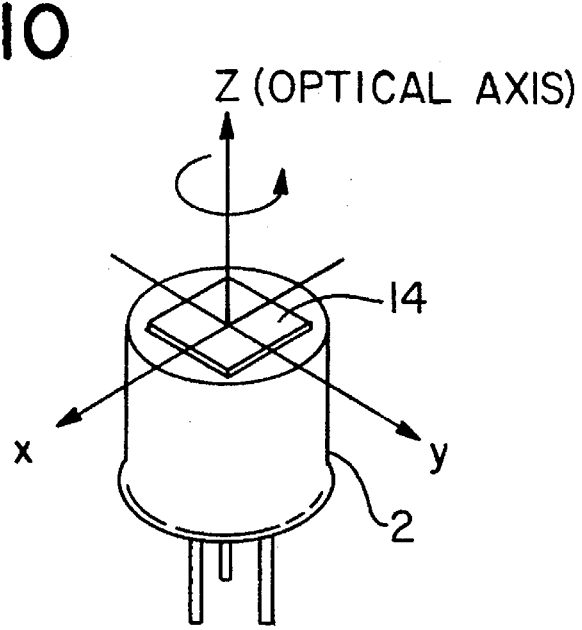
FIG. 10 is a perspective view of the pyroelectric type infrared sensor of sixth embodiment of the invention.
Figure 11:
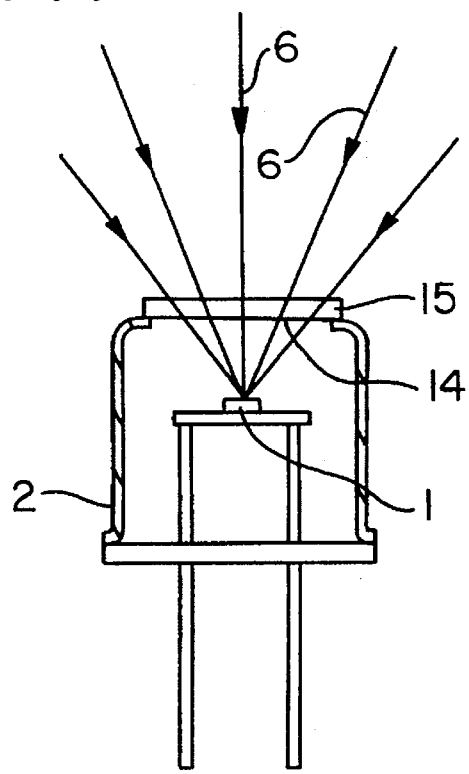
FIG. 11 is a sectional view of the pyroelectric type infrared sensor.

A sixth embodiment of the invention will be illustrated referring to FIGS. 10 and 11. Like elements as in the first embodiment are the same and the illustration of those elements is omitted.

Figure 12:
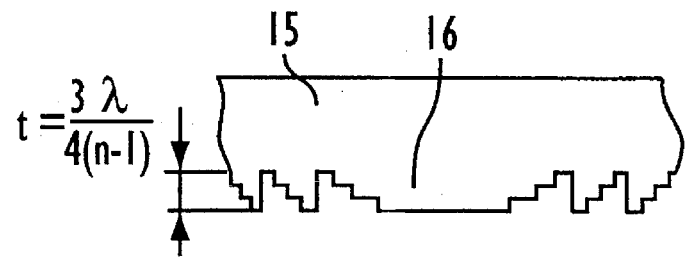
FIG. 12 is an enlarged sectional view of the diffraction optical element of the pyroelectric type infrared sensor.
Figure 13:
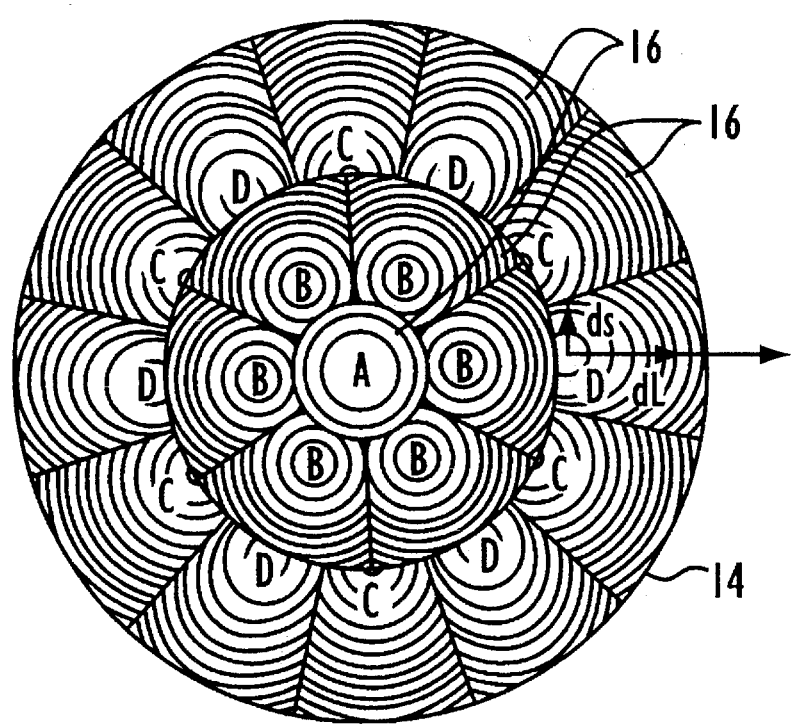
FIG. 13 is a plan view of the diffraction optical element array of the pyroelectric type infrared sensor.
Figure 14:
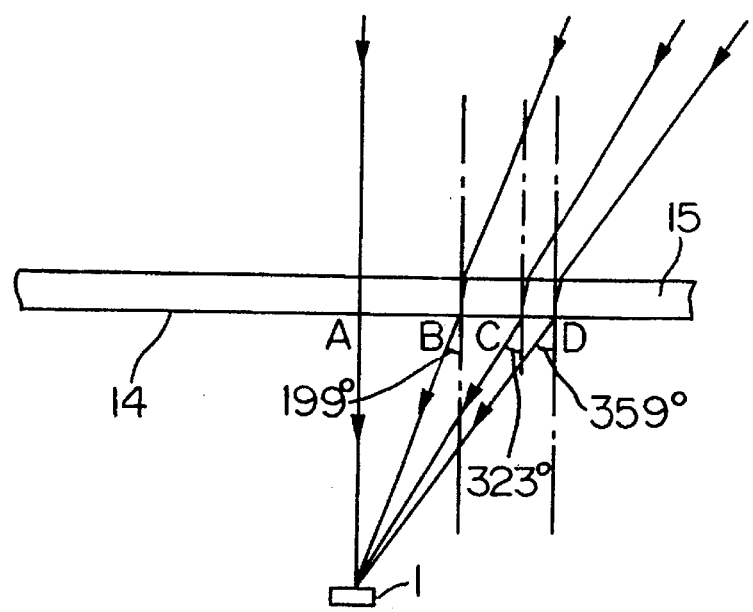
FIG. 14 is a sectional view of the diffraction optical element array of the pyroelectric type infrared sensor.
Figure 15:
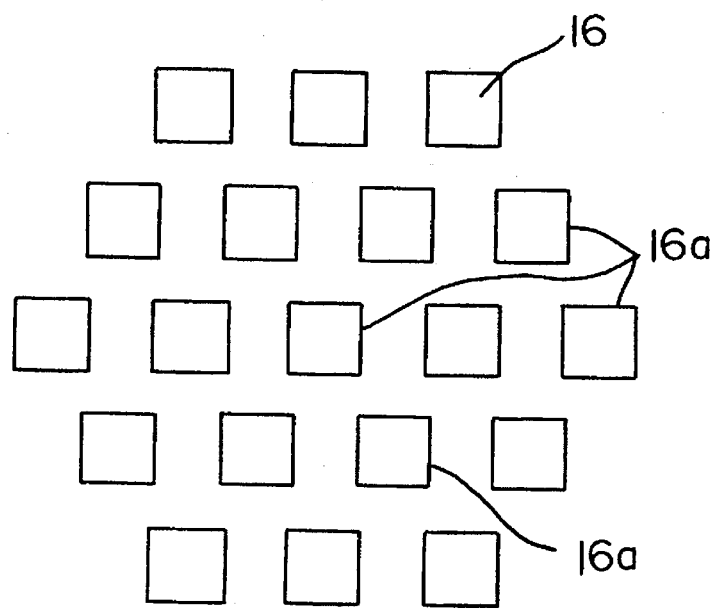
FIG. 15 shows the detecting range of the diffraction optical element array of the pyroelectric type infrared sensor.
Figure 16:
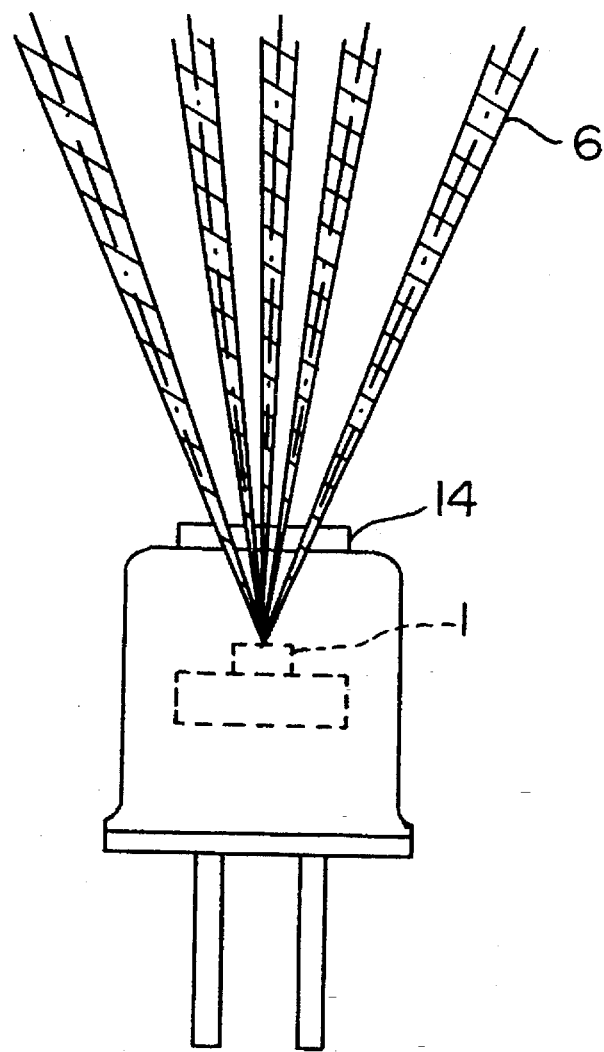
FIG. 16 shows incident infrared rays onto the diffraction optical element array of the pyroelectric type infrared sensor.
Figure 17A:
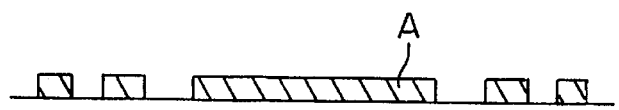
FIG. 17 is a process view of a diffraction optical element of the pyroelectric type infrared sensor.
Figure 17B:
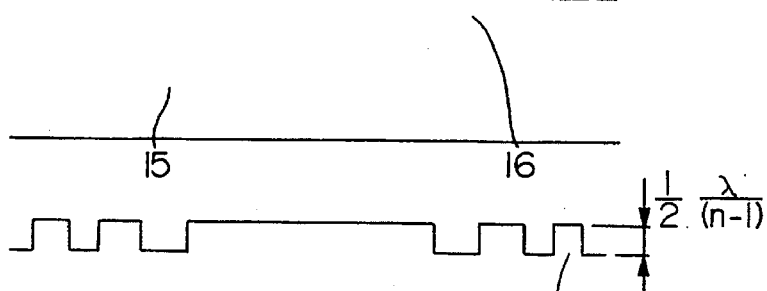
Figure 17C:
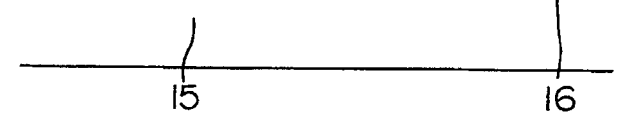
Figure 17D:
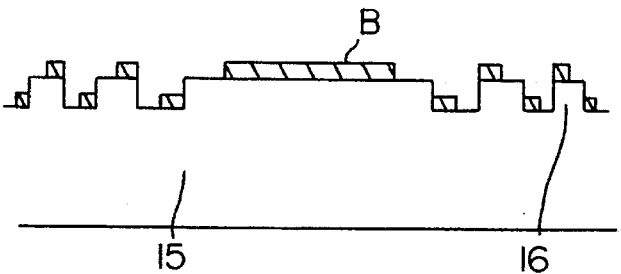

FIG. 10 and FIG. 11 are a perspective view and a sectional view of a pyroelectric type infrared sensor of the sixth embodiment of the invention. As shown in the figures, a diffraction optical element array 14 is used for focusing or imaging the infrared rays 6 onto the pyroelectric element 1, and installed integrally in the thinner surface of the incident infrared ray filter 15, and a plurality of diffraction optical lenses (diffraction optical elements) 16 are radially formed as shown in FIG. 12–FIG. 14. These diffraction optical lenses 16, as shown in FIG. 15, are equidistantly spaced so that the visual fields 16a cover all the area to be detected. Each of the diffraction optical lenses 16, as shown in FIG. 14 and FIG. 16, focuses or images the incident infrared rays having the incident angles corresponding to the visual fields shown in FIG. 15 onto the pyroelectric element 1 in order to correspond to the visual field shown in FIG. 15. For example, perpendicular to the surface of the diffraction optical element array 14 formed on the incident infrared filter 15, the incident angle of the diffraction optical lens 16 at A position in FIG. 13 and FIG. 14 is 0°, the incident angle of the diffraction optical lens 16 at B position is 19.9°, the incident angle of the diffraction optical lens 16 at C position is 32.3°, and the incident angle of the diffraction optical lens 16 at D position is 35.9°.

The operation of this embodiment is described below. First, infrared rays 6 emitted from an object to be detected in a certain direction reach the incident infrared ray filter 15. The reached infrared rays 6 are focused or imaged on the pyroelectric element 1 by the diffraction optical lens 16 corresponding to them in the diffraction optical element array 14 formed on the back surface of the incident infrared filter 15. As a result, the temperature of the pyroelectric element 1 is changed, and the neutral charge state on the surface is broken and changed. The charge in this moment is detected to measure the quantity of incident infrared rays.

In this embodiment, a plurality of the diffraction optical lenses 16 having a different incident angle respectively are formed as the diffraction optical element array 14 integrally with the incident infrared filter 15. Accordingly, the infrared rays in a wide range can be detected. Using this structure, there is no need to provide an external lens outside of a sealed tube 2, resulting in the compact size. Also, because there is no external lens, the permeability can be improved. For example, suppose that the lens is of polyethylene and is for detecting human motion, since the wavelength of the infrared rays emitted from a human body are about 10 μm and permeability is about 50%, so the permeability is about two times of the case having an external lens. Also cost is decreased because there is no external lens. Also, when the infrared rays 6 passing a plurality of diffraction optical lens 16 formed on the incident infrared ray filter 15 is adjusted beforehand so as to focus or image on the pyroelectric element 1, since the direction of optical axis and the rotation direction of the two axes (x, y axes) on a plan perpendicular to the optical axes are fixed beforehand in the step for installing the incident infrared ray filter 15 to the sealed tube 2 as shown in FIG. 10, the optical adjusting is completed by only positional arranging of rotation direction of x, y axes and optical axis. Accordingly, optical adjusting is easy.

Next, a plurality of the diffraction optical lenses 16 forming the diffraction optical element array 14 having recesses or slots corresponding to the phase modulation amount of each of the lenses, and the periods of the recesses or slot patterns get shorter as they move outward as shown in FIG. 12 and FIG. 13 to focus at a spot by utilizing diffraction phenomena. All the depths of the recesses or slots of the diffraction optical lens 16 are the identical, and the depth and the surface figure depend on the wavelength of incident infrared rays. The light is focused utilizing diffraction phenomena of the light.

In this embodiment, since the depth of the recesses or slots are identical all over the diffraction optical lens 16, recesses or slots can be formed easily by etching.

In this embodiment, as shown in FIG. 12, the recesses or slot is a stair-like shape with four steps. It was discovered that the maximum depth t of the recesses or slots which makes the primary diffraction efficiency of the diffraction optical lens 16 maximum is:

$$t=\frac{3}{4}\times\lambda/(n-1)$$

where, n is the refractive index, and λ is the wavelength of an incident light. The primary diffraction efficiency in this case is 81% if the reflection on the surface is neglected.

Also, with a plurality of the diffraction optical lens 16 forming the diffraction optical element array 14, as shown in FIG. 13, the recesses or slot pattern in the positions B, C, and D where incident angles are not 0 is elliptical in shape, and each center position of the ellipses gradually slides in the one direction of the major axis as the ellipse moves outward.

Using this structure, optical aberration can be corrected, so that there is no need to form the diffraction optical lenses 16 in a solid shape to prevent optical aberration. The inventors of the invention found that optical aberration can be corrected when the sectional shape of recesses or slots is a stair with four steps, where $\theta$ denotes oblique incident angle, $\lambda$ denotes the wavelength of infrared rays, f denotes image side focal length, n denotes refractive index of a passage medium (air in this embodiment). The major axes of the Mth ellipse is:

$$d_L=2/\cos\theta\times[(M\lambda/4n\cos\lambda)^2+M\lambda f/2]^{0.5}$$

The minor axis is:

$$d_s=d_1\times\cos\theta$$

The parting interval (the interval between the center position of Mth ellipse and that of the (M+1)th ellipse) is:

$$e=M\lambda\tan\theta/4n\cos\theta$$

As a result, diffraction optical lenses capable of superior focusing of an oblique incident light can be obtained.

Additionally, diffraction efficiency of a diffraction optical lens 16 is generally decreased as the incident angle is increased, but by enlarging the area of a plurality of diffraction optical lenses 16 forming the diffraction optical element array 14 as they go outward, the decrease of the diffraction efficiency due to increase of incident angle and the decreased quantity of incident light due to the increase of detecting distance can be compensated. As a result, nearly uniform sensitivity can be obtained even if incident angles or detecting distances are different.

Also, by arranging the plurality of diffraction optical lenses closely without gaps, the light receiving area can be effectively used and the diffraction optical element array 14 can be made smaller. Also, the incident angle to the diffraction optical lenses 16 in the central portion of the diffraction optical element array 14 is 0. By making the incident angle to the diffraction optical lens 16 gradually larger as it goes outward, the zone where the numerical aperture of the diffraction optical lens 16 is small, that is, a high diffraction efficiency for each of the diffraction optical lenses 16 can be obtained. As a result, the diffraction optical lenses 16 having a sufficiently high efficiency of focusing light can be obtained.

In a seventh embodiment of the invention an incident infrared ray filter 15 and a diffraction optical lens 16 are made of the identical substance including at least one substance selected from silicon and germanium, or at least one substance selected from gallium and indium and at least one substance selected from arsenic and phosphorus.

In operation, the refractive index of the incident infrared ray filter 15 made of silicon is about 3.5. When detecting humans, since the wavelength of the infrared rays emitted from human body is about 10 µm, the depth t of the recesses or slot is 3 µm when its sectional figure is stairs having four steps. This depth is about one fifth of the case using polyethylene (the refractive index n is about 1.5) for forming the diffraction optical lens 16. The depth of the recesses or slot can be made shallower, and an accurate lens figure can be readily realized in a short time by a planar process such as etching and deposition. Also, because of the shallow recesses or slot, the diffraction efficiency in the circumference where the period is small is good. Further, the decreasing of the diffraction efficiency for oblique incident light is small. Thus, a diffraction optical lens having excellent optical characteristics described above can be obtained.

Also, whichever materials of germanium, gallium arsenide, indium phosphide, and gallium phosphide, have a refractive index n of more than 3 like silicon, so the depth of the recesses or slot can be made shallower by using them, accurate lens figure can be realized, and the diffraction optical lens 16 having excellent focus characteristics can be obtained.

Next, the steps for forming a stair-like recesses or slot will be illustrated. As shown in FIG. 17, the stair-like recesses or figure of the diffraction optical lens 16 is formed by etching. The recesses or slot is stairs with four steps, and a resist pattern A shown in FIG. 17(*a*) is formed by a first process of photolithography. Next, recesses or slots are made by the depth about ½×λ/(n−1) by dry etching as shown in FIG. 17(*b*), here n denotes refractive index, λ denotes the wavelength of incident light. Next, the resist pattern B shown in FIG. 17(*c*) is formed by the second process of photolithography. Then, the recesses or slots are dry etched by a depth of about ¼×r/(n−1), and the diffraction optical lens 16 is formed. Using dry etching, the edges of the rectangular can be made in sharp and accurate figures, and this results in a diffraction optical lens 16 having an excellent diffraction efficiency.

Next, an eight embodiment of the invention will be illustrated referring to FIG. 18. FIG. 18 is a schematic sectional view of the diffraction optical lens 17 of the eighth embodiment of the invention. As shown in the figure, the diffraction optical lens 17 is formed at an incident infrared ray filter 18. Though one pitch of the recesses or slot in the sixth embodiment is formed in four step figure by two processes, in the eighth embodiment one pitch of a recesses or slot is formed by more processes (m steps), for example m =8. The most suitable maximum depth t of the recesses or slot is:

$$(m-1)/m\times\lambda/(n-1)$$

where, n denotes refractive index, and λ denotes the wavelength of the incident light. As the number of steps increases, focusing efficiency becomes higher. When the number of steps m is around 16 and the reflection is neglected, the focusing efficiency increases to about 99% at its maximum. The most suitable, maximum depth in this case is about $\lambda/(n1)$.

Also, regarding the diffraction optical lenses 17 whose optical axes having respectively an angle with respect to the direction of the perpendicular of the surface of a pyroelectric element 1 are scattered, the inventors found that the optical aberration can be corrected by following condition that, when θ denotes an oblique incident angle, λ denotes the wavelength of the infrared rays, f denotes the focal length of image side, n denotes the refractive index of passage medium (air in the invention), major axis is:

$$d_L=2/\cos\theta\times[(M\,\lambda/m\,n\cos\theta)^2+2M\,\lambda f/m]^{0.5}$$

The minor axis is:

$$d_s\times d_L\times\cos\theta$$

The parting interval is:

$$e=M\,\lambda\tan\theta/m\,n\cos\theta$$

Figure 19:
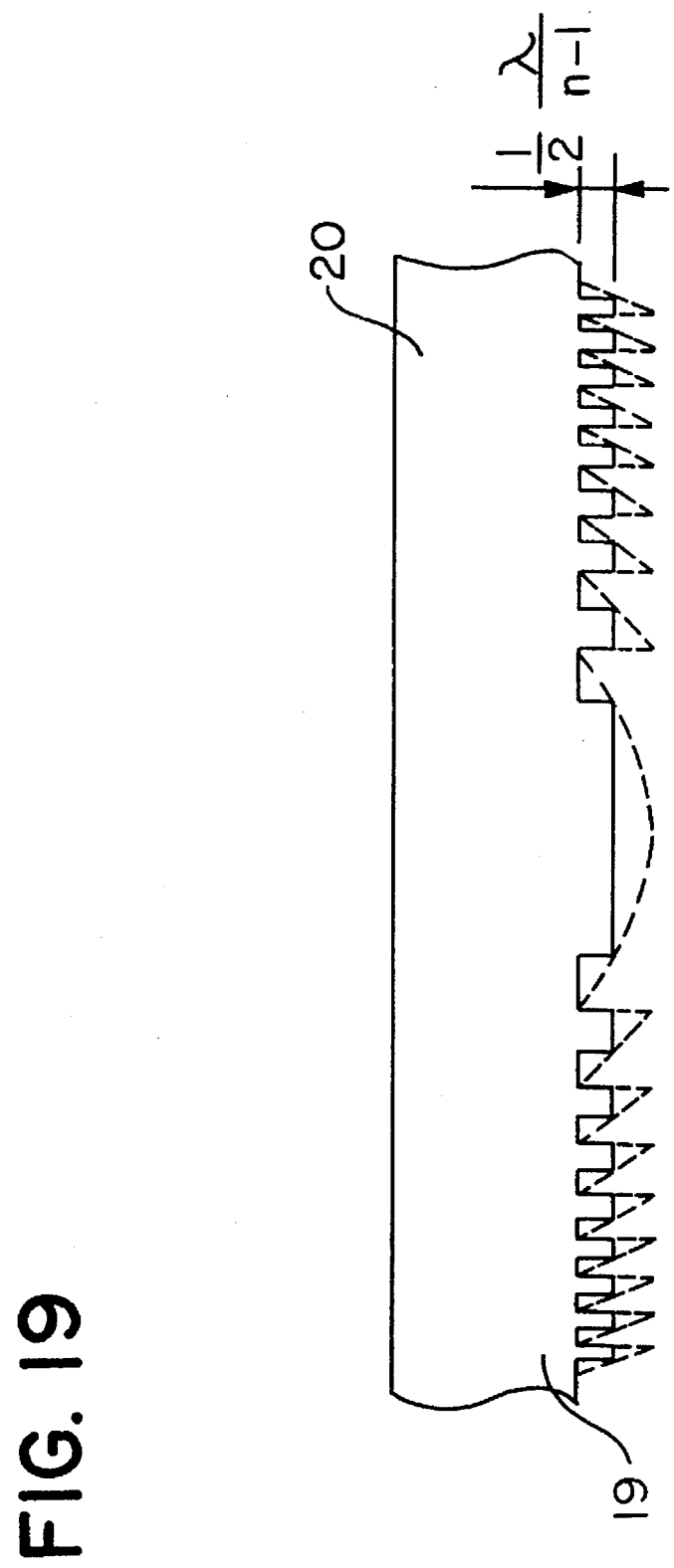
FIG. 19 is an enlarged sectional view of a diffraction optical element of the pyroelectric type infrared sensor of a ninth embodiment of the invention.
Figure 20:
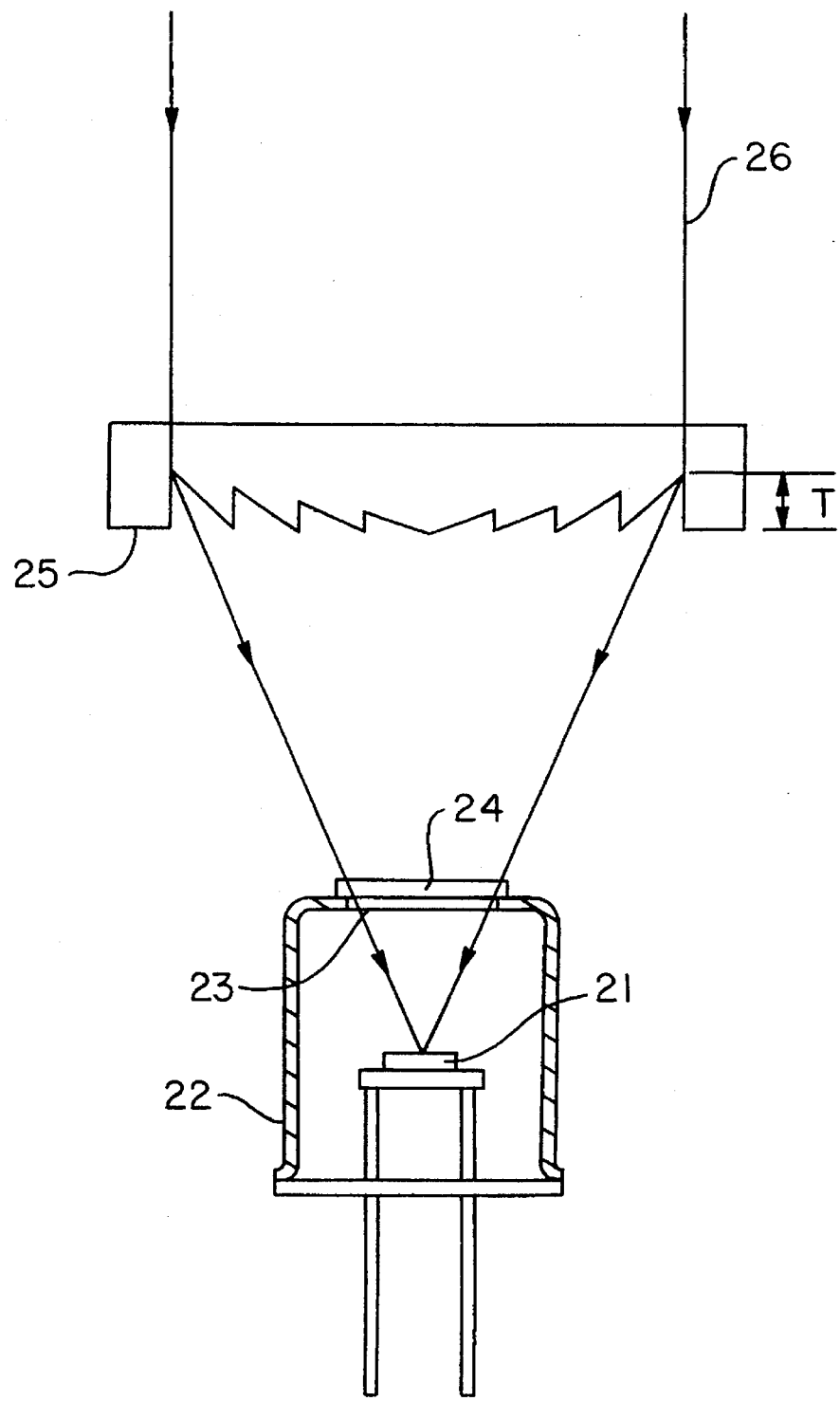
FIG. 20 is a sectional view of a conventional pyroelectric type infrared sensor.

Next, a ninth embodiment of the invention will be illustrated referring to FIG. 19. FIG. 19 is a schematic sectional view of a diffraction optical lens 19 of the ninth embodiment of the invention. As shown in the figure, the diffraction optical lens 19 is formed at a incident infrared ray filter 20. The shape of the recesses or slot of the diffraction optical lens 19 is rectangular, and the pitch of the recesses or slot becomes smaller as the position of the slot moves outward.

The most suitable maximum depth t of the recesses or slot to make the primary diffraction efficiency of the diffraction optical lens 19 maximum is:

$$t = \tfrac{1}{2} \times \lambda/(n-1)$$

where, n denotes refractive index and $\lambda$ denotes the wavelength of the incident light.

The diffraction efficiency of this embodiment is about half (41%) of that of the diffraction optical lens 16 of the sixth embodiment when the reflection is neglected, but the diffraction optical lens 19 is formed by one etching process, accordingly mass production is easy.

Also, regarding the diffraction optical lenses 19 whose optical axes having respectively an angle with respect to the direction of the perpendicular of the surface of a pyroelectric element 1 are scattered, the inventors found that the optical aberration can be corrected by following condition that, when $\theta$ denotes an oblique incident angle, $\lambda$ denotes the wavelength of the infrared rays, f denotes the focal length of image side, and n denotes the refractive index of a passage medium (air in the invention), the major axis is:

$$d_L = 2/\cos\theta \times [(M\lambda/4n\cos\theta)^2 + 2M\lambda f/m]^{0.5}$$

The minor axis is:

$$d_s = d_L \times \cos\theta$$

The parting interval is:

$$e = M\lambda \tan\theta/2n\cos\theta.$$

Using dry etching instead of wet etching, the edges of the rectangular can be made in sharp and accurate figures, resulting in a diffraction optical lens 16 having an excellent diffraction efficiency.

By forming a non-reflective interference film on the front or back surface of the diffraction optical lens 16, 17, or 19, as the reflection at the diffraction optical lens 16, 17 or 19 becomes small, the sensitivity of the pyroelectric type infrared sensor can be further improved.

Also by providing an interference film filter passing only a specific range of wavelength, by vapor deposition method for example, on the surface of the infrared ray filter 15, 18 or 20, the surface is on the opposite side of the surface on which the diffraction optical lens 16, 17, or 19 is formed, the disturbance light such as the sun light and incandescent light can be cut and the sensitivity of the pyroelectric type infrared sensor can be further improved.

Also, by forming the diffraction optical lens 16, 17, or 19 on the surface facing the pyroelectric element 1, that is, inside of the sealed tube 2, the recesses or slots are protected from damage, dust, stain, and the like, thus the function can be kept semi-permanently.

Additionally, by forming the pyroelectric element 1 of a thin film of lead titanate containing lanthanum, the pyroelectric type infrared sensor can be made smaller.

Further, diffraction optical lens 16, 17, or 19 is used as a diffraction optical element though, the same effect can be obtained by using a variable refractive index type diffraction optical lens.

Of course, it should be understood that a wide range of changes and modifications can be made to the embodiments described above. It is therefore intended that the foregoing detailed description be understood as illustrative rather than limiting, and that it be understood that it is the following claims, including all equivalents, which are intended to define the scope of the invention.

What is claimed is:

1. A pyroelectric type infrared sensor comprising:
    a sealed body having an opening;
    a pyroelectric element provided in said sealed body for detecting infrared rays;
    an incident infrared ray filter provided at the opening of said sealed body; and
    an ultra thin shaped diffraction optical element integrally formed on a front or back surface of said incident infrared ray filter for focusing or imaging said infrared rays onto said pyroelectric element.

2. The pyroelectric type infrared sensor of claim 1, wherein said diffraction optical element has a plurality of slots corresponding to its phase modulation amounts, all of said slots on said diffraction optical element having the same depth and said slots' shape being adapted to depend on the wavelength of the incident infrared rays.

3. The pyroelectric type infrared sensor of claim 1, wherein said diffraction optical element has slots corresponding to its phase modulation amounts, said slots having a stair-like figure and a depth of $(m-1)/m \times \lambda/(n-1)$, where m denotes a number of steps, $\lambda$ denotes wavelength of a main incident infrared rays, and n denotes a refractive index of an incident infrared ray filter.

4. The pyroelectric type infrared sensor of claim 1, wherein said diffraction optical element has slots corresponding to its phase modulation amounts, said slots being formed in rectangular shapes.

5. The pyroelectric type infrared sensor of claim 1, wherein said incident infrared ray filter and said diffraction optical element are made of an identical substance, said substance having a refractive index of more than 3, and said substance being selected from at least one selected from silicon or germanium; or at least one from gallium and indium and at least one from arsenic and phosphorus.

6. The pyroelectric type infrared sensor of claim 5, wherein said incident infrared ray filter and said diffraction optical element are made of the substance selected from silicon, germanium, gallium arsenide, indium phosphide, and gallium phosphide.

7. The pyroelectric type infrared sensor of claim 1, wherein said pyroelectric element is formed of a thin film of lead titanate containing lanthanum.

8. A pyroelectric type infrared sensor comprising:
    a pyroelectric element for detecting infrared rays;
    a sealed body accommodating said pyroelectric element and having an opening;
    an incident infrared ray filter provided at the opening of said sealed body; and
    an ultra thin shaped diffraction optical element array integrally formed on a front or back surface of said incident infrared ray filter;
    said diffraction optical element array having at least two diffraction optical elements, said diffraction optical elements being adapted to focus or image incident infrared rays onto said pyroelectric element respectively.

9. The pyroelectric type infrared sensor of claim 8, wherein each said diffraction optical element has a plurality of slots corresponding to its phase modulation amounts, all of said slots on the diffraction optical element having the same depth and all of said slots adapted to depend on the wavelength of the incident infrared rays.

10. The pyroelectric type infrared infrared sensor of claim 8, wherein each said diffraction optical element has recessed slots corresponding to its phase modulation amounts, said recessed slots having a elliptical shape, a center position of said elliptical shape gradually sliding in direction of a major axis of the elliptical shape as the center position of said ellipse moves outward.

11. The pyroelectric type infrared sensor of claim 8, wherein each said diffraction optical element has slots corresponding to its phase modulation amounts, said slots being formed in rectangular shapes.

12. The pyroelectric type infrared sensor of claim 8, wherein each said diffraction optical element has recessed slots corresponding to the phase modulation amounts, said recessed slots having a form of stairs with m steps, said recessed slots having a maximum depth of $(m-1)/m \times \lambda/(n-1)$, where m denotes a number of steps, $\lambda$ denotes wavelength of a main incident infrared rays, and n denotes refractive index of an incident infrared ray filter.

13. The pyroelectric type infrared sensor of claim 8, wherein each said diffraction optical element has slots corresponding to its phase modulation amounts, and said slots are formed in rectangular shape.

14. The pyroelectric type infrared sensor of claim 8, wherein each said diffraction optical element has a wider area as the diffraction optical element moves toward the circumference of the diffraction optical element array.

15. The pyroelectric type infrared sensor of claim 8, wherein said diffraction optical element array is formed by arranging a plurality of diffraction optical elements in side by side relation without a gap.

16. The pyroelectric type infrared sensor of claim 8, wherein among a plurality diffraction optical elements, a incident angle in a central portion of said plurality of diffraction optical elements is 0°, and said incident angle increases, as the position of the diffraction optical element moves toward a circumference of the diffraction optical element array.

17. The pyroelectric type infrared sensor of claim 8, wherein said incident infrared ray filter and said diffraction optical elements are made of an identical substance, said substance having a refractive index of more than 3, and said substance including at least one selected from silicon or germanium; or at least one from gallium and indium and at least one from arsenic and phosphorus.

18. The pyroelectric type infrared sensor of claim 17, wherein said incident infrared ray filter and said diffraction optical elements are made of the substance selected from silicon, germanium, gallium arsenide, indium phosphide, and gallium phosphide.

19. The pyroelectric type infrared sensor of claim 8, wherein said pyroelectric elements are formed on the surface facing the pyroelectric element, of the incident infrared ray filter.

20. The pyroelectric type infrared sensor of claim 8, wherein said pyroelectric elements are formed of a thin film of lead titanate containing lanthanum.

21. A pyroelectric type infrared sensor comprising:

a sealed body having an opening;

a pyroelectric element provided in said sealed body for detecting infrared rays;

an incident infrared ray filter provided at the opening of said sealed body; and a diffraction optical element provided on a front or back surface of said incident infrared ray filter for focusing or imaging said infrared rays onto said pyroelectric element, said diffraction optical element having a non-reflection interference film on its front surface or back surface.

22. A pyroelectric type infrared sensor comprising:

a sealed body having an opening;

a pyroelectric element provided in said sealed body for detecting infrared rays;

an incident infrared ray filter provided at the opening of said sealed body; and a diffraction optical element provided on a front or back surface of said incident infrared ray filter for focusing or imaging said infrared rays onto said pyroelectric element;

wherein said incident infrared ray filter has an interference film filter passing a specific range of wavelength on a surface opposite to the surface on which the diffraction optical element is formed.

23. A pyroelectric type infrared sensor comprising:

a sealed body having an opening;

a pyroelectric element provided in said sealed body for detecting infrared rays;

an incident infrared ray filter provided at the opening of said sealed body;

a diffraction optical element provided on a front or back surface of said incident infrared ray filter for focusing or imaging said infrared rays onto said pyroelectric element; and an interference film filter passing a specific wavelength on a surface opposite to the surface on which the diffraction optical element is formed, wherein said incident infrared ray filter and said diffraction optical element are made of an identical substance, said substance having a refractive index of more than 3, and said substance being selected from at least one selected from silicon or germanium; or at least one from gallium and indium and at least one from arsenic and phosphorus.

24. A pyroelectric type infrared sensor comprising:

a pyroelectric element for detecting infrared rays;

a sealed body accommodating said pyroelectric element and having an opening;

an incident infrared ray filter provided at the opening of said sealed body; and a diffraction optical element array provided on a front or back surface of said incident infrared ray filter;

said diffraction optical element array having at least two diffraction optical elements, said diffraction optical elements having a non-reflection interference film on their front surfaces or back surfaces and being adapted to focus or image incident infrared rays onto said pyroelectric element respectively.

25. A pyroelectric type infrared sensor comprising:

a pyroelectric element for detecting infrared rays;

a sealed body accommodating said pyroelectric element and having an opening;

an incident infrared ray filter provided at the opening of said sealed body; and a diffraction optical element array provided on a front or back surface of said incident infrared ray filter;

said diffraction optical element array having at least two diffraction optical elements, said diffraction optical elements adapted to focus or image incident infrared rays onto said pyroelectric element respectively, wherein said incident infrared ray filter has an interference film filter passing a specific range of wavelength on its surface opposite to the surface on which the diffraction optical element array is formed.

\* \* \* \* \*

UNITED STATES PATENT AND TRADEMARK OFFICE
CERTIFICATE OF CORRECTION

PATENT NO. : 5,567,941
DATED : October 22, 1996
INVENTOR(S) : Fujikawa et al.

It is certified that error appears in the above-identified patent and that said Letters Patent is hereby corrected as shown below:

| | |
|---|---|
| Col. 12, line 66: | After "has" delete "recessed" |
| Col. 13, line 1: | Before "slots" delete "recessed" |
| Col. 13, line 9: | After "has" delete "recessed" |
| Col. 13, line 11: | After "has" delete "recessed" |
| Col. 13, line 13: | After "has" delete "recessed" |

Signed and Sealed this

Twenty-fourth Day of November, 1998

BRUCE LEHMAN

*Attest:*

*Attesting Officer*  *Commissioner of Patents and Trademarks*